United States Patent
Kohler

(10) Patent No.: US 8,268,923 B2
(45) Date of Patent: Sep. 18, 2012

(54) PRODUCTION OF SOLUTIONS OF VINYL POLYMERS IN REACTIVE MONOMERS

(75) Inventor: Thomas Kohler, Kastl (DE)

(73) Assignee: Wacker Chemie AG, Munich (DE)

( * ) Notice: Subject to any disclaimer, the term of this patent is extended or adjusted under 35 U.S.C. 154(b) by 130 days.

(21) Appl. No.: 12/744,187

(22) PCT Filed: Nov. 10, 2008

(86) PCT No.: PCT/EP2008/065194
§ 371 (c)(1),
(2), (4) Date: May 21, 2010

(87) PCT Pub. No.: WO2009/065749
PCT Pub. Date: May 28, 2009

(65) Prior Publication Data
US 2010/0286347 A1    Nov. 11, 2010

(30) Foreign Application Priority Data
Nov. 21, 2007 (DE) .......................... 10 2007 047 837

(51) Int. Cl.
*C08F 2/00* (2006.01)
(52) U.S. Cl. .......................... 524/539; 524/500; 522/114
(58) Field of Classification Search .................. 522/114; 524/500, 539
See application file for complete search history.

(56) References Cited

U.S. PATENT DOCUMENTS

| 5,391,631 A | 2/1995 | Porsch et al. |
| 5,763,546 A | 6/1998 | Jung et al. |
| 2006/0173142 A1 | 8/2006 | Nava et al. |
| 2009/0105405 A1 | 4/2009 | Graewe et al. |
| 2009/0182090 A1 | 7/2009 | Graewe |

FOREIGN PATENT DOCUMENTS

| DE | 10 2006 012 200 A1 | 9/2007 |
| DE | 10 2006 019 686 A1 | 10/2007 |
| EP | 0 274 273 A2 | 7/1988 |
| EP | 0 575 931 A1 | 12/1993 |
| EP | 0 506 703 B1 | 6/1994 |
| EP | 0 926 188 A2 | 6/1999 |
| WO | WO 2007/104639 A1 | 9/2007 |

OTHER PUBLICATIONS

International Search Report mailed Feb. 20, 2009.

*Primary Examiner* — David W Wu
*Assistant Examiner* — Vu A Nguyen
(74) *Attorney, Agent, or Firm* — RatnerPrestia

(57) ABSTRACT

The invention relates to a method for producing solutions of vinyl polymers in reactive monomers by a) polymerizing by radical initiation one or more ethylene unsaturated monomers selected from the group comprising vinyl esters, acrylic acid esters, and methacrylic acid esters, and optionally one or more further ethylene unsaturated monomers, and subsequently b) optionally distilling off volatile components, and c) optionally adding one or more inert solvents, d) mixing with one or more reactive monomers, and e) optionally distilling off the inert solvent, characterized in that the vinyl polymers are not present as isolated solids in any of the steps a) through e).

11 Claims, No Drawings

PRODUCTION OF SOLUTIONS OF VINYL POLYMERS IN REACTIVE MONOMERS

CROSS REFERENCE TO RELATED APPLICATIONS

This application is the national stage filing of PCT application number EP2008/065194, filed Nov. 10, 2008, and claims priority of German patent application number 102007047837.4, filed Nov. 21, 2007, the entireties of which applications are incorporated herein by reference.

FIELD OF THE INVENTION

The invention relates to processes for producing solutions of vinyl polymers in reactive monomers, and also to the solutions obtainable by using the process, and to the use of these, for example, as low-profile additive (LPA) in producing moldings.

BACKGROUND OF THE INVENTION

Vinyl polymers are obtainable via free-radical-initiated polymerization of ethylenically unsaturated monomers, and are mostly solid at room temperature. However, many applications require vinyl polymers in the form of solutions in liquid, polymerizable monomers (reactive monomers), an example being styrene. Solid vinyl polymers therefore first have to be converted to the actual usage form, and by way of example this can be achieved via dissolution in reactive monomers, for example as described in DE-A 102006012200 or DE-A 102006019686. For the dissolution process, solid vinyl polymers, usually in powder form or in the form of granules, are added to the reactive monomers. The dissolution process therefore represents a separate operation that consumes resources and that requires appropriate equipment. Furthermore, preventive measures have to be taken to avoid dust explosions.

As an alternative, it is also possible to melt solid vinyl polymers and to add them in the molten state to the reactive monomers. This procedure, too, requires resources in the form of apparatus, an example of the appropriate equipment required being a melting unit and a dissolution vessel. Care also has to be taken that introduction of the polymer melt does not heat the reactive monomers to an extent that results in thermally initiated polymerization; this poses enormous safety problems and can moreover require implementation of waste-disposal measures for the entire batch.

Particular problems are raised by the production of appropriate solutions of vinyl polymers with low glass transition temperatures Tg (e.g. Tg$\leq$35° C.), because vinyl polymers with low glass transition temperatures Tg tend to cake or agglutinate at room temperature and cannot be stored in the form of powder or granules without cooling or addition of antiblocking agents. Vinyl polymers with low glass transition temperatures Tg are therefore generally marketed in the form of blocks (e.g. 25 kg blocks). However, the production of solutions via dissolution of these blocks is time-consuming and requires large-dimension dissolution equipment with high mechanical stability, because the surface area of the blocks is small in comparison with that of corresponding powders or granules. Comminution of the blocks is in practice difficult, because vinyl polymers with low glass transition temperatures Tg are tough materials. If vinyl polymers with low glass transition temperatures Tg are melted and the hot melt is added to the reactive monomer, the problems described above are again encountered. The use of vinyl polymers in the form of blocks is therefore an inflexible process in terms of batch size and is attended by considerable problems in the preparation process.

SUMMARY OF THE INVENTION

It was therefore the object to provide processes which produce solutions of vinyl polymers in reactive monomers and which avoid the disadvantages described above.

DETAILED DESCRIPTION OF THE INVENTION

The invention provides processes for producing solutions of vinyl polymers in reactive monomers via a) free-radical-initiated polymerization from one or more ethylenically unsaturated monomers selected from the group consisting of vinyl esters, acrylic esters, and methacrylic esters, and, if appropriate, from one or more other ethylenically unsaturated monomers, and then b) if appropriate, removing volatile constituents by distillation, and c) if appropriate, addition of one or more inert solvents, d) mixing with one or more reactive monomers, and e) if appropriate, removing the inert solvents by distillation, characterized in that the vinyl polymers are not present in the form of isolated solid in any of the steps a) to e).

It is essential that the vinyl polymers are not isolated as solid intermediately in any of the steps a) to e) of the process, i.e. either prior to or during the mixing with the reactive monomers, and the implication of this for the invention is that in all of the steps of the process, i.e. prior to and during the mixing with the reactive monomers, the vinyl polymers are present in a flowable form.

The viscosities of the vinyl polymers in a flowable form are preferably $\leq$10 000 000 Pa·s, particularly preferably $\leq$5 000 000 Pa·s, and most preferably $\leq$1 000 000 Pa·s (determined by the Bohlin CVO 120 HR rheometer at the respective temperature in the respective step of the process).

The vinyl polymers are, if appropriate, kept in a flowable form via heating and/or via addition of an inert solvent or of a mixture of inert solvents.

To produce the vinyl polymers via polymerization, it is preferable to use one or more vinyl esters of unbranched or branched carboxylic acid having from 1 to 18 carbon atoms. Particularly preferred vinyl esters are vinyl acetate, vinyl propionate, vinyl butyrate, vinyl 2-ethylhexanoate, vinyl laurate, and vinyl esters of $\alpha$-branched monocarboxylic acids having from 5 to 13 carbon atoms, for example vinyl pivalate, VeoVa9® or VeoVa10® (trademark of Hexion). Vinyl acetate is most preferred.

Preferred acrylic esters and methacrylic esters are acrylic esters and methacrylic esters of unbranched or branched alcohols having from 1 to 15 carbon atoms. Examples of preferred acrylic esters or methacrylic esters are methyl acrylate, methyl methacrylate, ethyl acrylate, ethyl methacrylate, propyl acrylate, propyl methacrylate, n-, iso-, and tert-butyl acrylate, n-, iso-, and tert-butyl methacrylate, 2-ethylhexyl acrylate, norbornyl acrylate, isobornyl acrylate, stearyl acrylate. Particular preference is given to methyl acrylate, methyl methacrylate, n-, iso-, and tert-butyl acrylate, 2-ethylhexyl acrylate, and isobornyl acrylate.

Other ethylenically unsaturated monomers that can be used are one or more monomers selected from the group consisting of vinyl aromatics, olefins, dienes, and vinyl halides. The proportion of the last-mentioned group of ethylenically unsaturated monomers in the vinyl polymers is preferably from 0 to 60% by weight, particularly preferably from 10 to 50% by weight, and most preferably from 20 to 40% by weight, based in each case on the total weight of the monomers for producing the vinyl polymers.

Preferred dienes are 1,3-butadiene and isoprene. Examples of copolymerizable olefins are ethene and propene. Vinyl aromatics that can be copolymerized are styrene and vinyl toluene. From the vinyl halides group, it is usual to use vinyl chloride, vinylidene chloride, or vinyl fluoride, preferably vinyl chloride.

Other suitable ethylenically unsaturated monomers are ethylenically unsaturated monomers having functional groups, for example epoxy groups, carboxylic acid groups, sulfonic acid groups, or phosphonic acid groups. Preference is given here to ethylenically unsaturated epoxides, mono- and dicarboxylic acids, sulfonates, and phosphonates, where these have from 1 to 20 carbon atoms, particularly preferably from 1 to 10 carbon atoms, where the arrangement of these can be linear or branched, open-chain or cyclic. Most preference here is given to ethylenically unsaturated epoxides and ethylenically unsaturated mono- and dicarboxylic acids.

Examples of preferred ethylenically unsaturated epoxides are glycidyl acrylate, glycidyl methacrylate (GMA), or allyl glycidyl ether. Particular preference is given to glycidyl acrylate and glycidyl methacrylate, particularly glycidyl methacrylate.

Examples of preferred ethylenically unsaturated carboxylic acids are acrylic acid, methacrylic acid, crotonic acid, and fumaric acid. An example of a preferred ethylenically unsaturated sulfonate is vinylsulfonate. An example of a preferred ethylenically unsaturated phosphonate is vinylphosphonate.

The proportion used of the ethylenically unsaturated monomers having functional groups is generally from 0 to 20% by weight, preferably from 0.1% by weight to 15% by weight, particularly preferably from 0.1% by weight to 10% by weight, and most preferably from 0.5 to 5% by weight, based in each case on the total weight of the monomers for producing the vinyl polymers.

Examples of suitable vinyl polymers are homopolymers of vinyl esters, and copolymers of a plurality of vinyl esters, and copolymers of one or more vinyl esters and of one or more ethylenically unsaturated monomers. Preference is given to vinyl polymers based on vinyl acetate and, if appropriate, on one or more other monomers selected from the group consisting of vinyl laurate, butyl acrylate, glycidyl methacrylate, acrylic acid, crotonic acid, and ethene.

Examples of suitable vinyl homo- and copolymers are vinyl acetate homopolymers, copolymers of vinyl acetate and ethene, copolymers of vinyl acetate with one or more other vinyl esters and, if appropriate, ethene, copolymers of vinyl acetate and of one or more acrylic esters and, if appropriate, ethene, copolymers of vinyl acetate with one or more ethylenically unsaturated carboxylic acids and, if appropriate, ethene, and copolymers of vinyl acetate with one or more other vinyl esters and of one or more ethylenically unsaturated carboxylic acids and, if appropriate, ethene, and copolymers of vinyl acetate with one or more other vinyl esters and with one or more acrylic esters, and, if appropriate, ethene.

Preference is given to vinyl acetate homopolymers; copolymers of vinyl acetate with from 1 to 50% by weight of one or more vinyl esters having from 1 to 12 carbon atoms in the carboxylic acid moiety, e.g. vinyl propionate, vinyl laurate, vinyl esters of alpha-branched carboxylic acids having from 5 to 13 carbon atoms, e.g. VeoVa9®, VeoVa10®, VeoVa11®; copolymers of vinyl acetate and preferably from 1 to 60% by weight of acrylic ester of unbranched or branched alcohols having from 1 to 15 carbon atoms, particularly n-butyl acrylate or 2-ethyl hexyl acrylate; copolymers of vinyl acetate and from 0.1 to 10% by weight of ethylenically unsaturated monomers having carboxylic acid groups and from 1 to 15 carbon atoms, particularly acrylic acid, methacrylic acid, crotonic acid, and fumaric acid; preference is also given to copolymers having from 30 to 75% by weight of vinyl acetate, from 1 to 45% by weight of vinyl laurate or vinyl ester of an alpha-branched carboxylic acid having from 5 to 13 carbon atoms, and also from 0.1 to 10% by weight of ethylenically unsaturated monomers having carboxylic acid groups and from 1 to 15 carbon atoms, in particular acrylic acid, methacrylic acid, fumaric acid, and crotonic acid; copolymers having from 30 to 75% by weight of vinyl acetate, from 1 to 30% by weight of vinyl laurate or vinyl ester of an alpha-branched carboxylic acid having from 5 to 13 carbon atoms, and also from 1 to 30% by weight of acrylic ester of unbranched or branched alcohols having from 1 to 15 carbon atoms, particularly n-butyl acrylate or 2-ethylhexyl acrylate; and copolymers having from 30 to 75% by weight of vinyl acetate, and also from 0.1 to 10% by weight of ethylenically unsaturated monomers having carboxylic acid groups, particularly acrylic acid, methacrylic acid, crotonic acid, and fumaric acid, and from 1 to 15 carbon atoms, from 1 to 45% by weight of acrylic ester of unbranched or branched alcohols having from 1 to 15 carbon atoms, particularly n-butyl acrylate or 2-ethylhexyl acrylate; the % by weight data here always give a total of 100% by weight.

Suitable, preferred, and particularly preferred reactive monomers are the same as the monomers which are also suitable, preferred and, respectively, particularly preferred for polymerization for producing the vinyl polymers. Very particularly preferred reactive monomers are styrene, methyl methacrylate, methyl acrylate, and butyl acrylate. The most preferred reactive monomer is styrene.

Polyfunctional ethylenically unsaturated monomers are also suitable reactive monomers. The polyfunctional ethylenically unsaturated monomers encompass acrylate derivatives, where these are usually used in UV-crosslinking systems. Examples of polyfunctional ethylenically unsaturated monomers are (meth)acrylic anhydride, allyl (meth)acrylate, ethylene glycol di(meth)acrylate, diethylene glycol di(meth)acrylate, triethylene glycol di(meth)acrylate, tetraethylene glycol di(meth)acrylate, polyethylene glycol 400 di(meth)acrylate, 1,3-butanediol di(meth)acrylate, 1,4-butanediol di(meth)acrylate, 1,6-hexanediol di(meth)acrylate, 1,12-dodecanediol di(meth)acrylate, glycerol 1,3-di(meth)acrylate, diurethane di(meth)acrylate, or trimethylolpropane tri(meth)acrylate.

The vinyl polymers are produced by the bulk-, suspension-, or preferably the solution-polymerization process. The vinyl polymers can also be obtained by subjecting the polymers obtained by means of the polymerization processes mentioned to one or more polymer-analogous reactions, for example those known to the person skilled in the art from EP-A 0506703.

Examples of suitable solvents or suitable components for mixtures of inert solvents are alcohols, ketones, esters, ethers, and aliphatic or aromatic hydrocarbons. Preferred solvents are monohydric, aliphatic alcohols having from 1 to 6 carbon atoms, e.g. methanol, ethanol, propanol, or isopropanol; ketones, such as acetone, methyl ethyl ketone, methyl isobutyl ketone; esters, such as methyl acetate, ethyl acetate, propyl acetate, butyl acetate; ethers, such as dimethyl ether, diethyl ether, methyl ethyl ether, methyl isobutyl ether, aromatics, such as benzene or toluene; aliphatics, such as pentane, hexane, heptane, or a mixture of these. Particular preference is given to methanol, ethanol, isopropanol, acetone, methyl ethyl ketone, methyl acetate, and ethyl acetate.

The reaction temperature for the polymerization is preferably from 40° C. to 180° C. The mixture is generally polymerized at reflux. It is preferable to use evaporative cooling to dissipate the heat of reaction. The polymerization can be conducted at atmospheric pressure or at superatmospheric pressure.

Examples of initiators that can be used are organic peroxides or azo compounds. Examples of suitable initiators are diacyl peroxides, such as dilauroyl peroxide, peroxoesters, such as tert-butyl peroxopivalate or tert-butyl 2-ethylperoxohexanoate, or peroxodicarbonates, such as diethyl peroxodicarbonate. The amount of initiator is generally from 0.01 to 5.0% by weight, based on the total weight of the monomers. The initiators can be used as initial charge or else can be added. A method that has proven successful here uses a portion of the necessary amount of initiator as initial charge and adds the remainder continuously during the reaction.

A batch process can be used for producing the polymers, where all of the components of the polymerization mixture are used as initial charge in the reactor, or a semibatch process can be used, where individual components or a plurality of components are used as initial charge and the remainder is added, or a continuous polymerization can be carried out, where the components are added during the polymerization. The additions can, if appropriate, be carried out separately (spatially and chronologically).

The molecular weight can be adjusted in a known manner via addition of regulator, via solvent content, via variation of initiator concentration, and via variation of temperature. Examples of suitable regulators are alcohols, such as methanol, ethanol, or isopropanol, aldehydes, such as acetaldehyde, propionaldehyde, or butyraldehyde, sulfur-containing regulators, such as thiols, thioacids, and thioesters, and mercaptosilanes, for example ethyl mercaptan, dodecyl mercaptan, thioacetic acid, mercaptopropionic acid, and 3-mercaptopropyltrimethoxysilane.

After the vinyl polymers have been produced by the processes described above, they are converted to the solutions of the invention. It is preferable that the mixing of the vinyl polymers with the reactive monomers takes place directly after polymerization to produce the vinyl polymers.

The mixing of the vinyl polymers with the reactive monomers is preferably carried out in a temperature range (mixing temperature range) from 20 to 140° C., particularly from 20 to 80° C., and most preferably from 40 to 80° C.

Examples of suitable or preferred inert solvents, or suitable or preferred components for mixtures of inert solvents are solvents identical with those that are suitable and, respectively, preferred as solvents for the polymerization. Particularly preferred inert solvents are methanol, ethanol, isopropanol, acetone, methyl ethyl ketone, methyl acetate, and ethyl acetate.

Vinyl polymers which are present in a flowable form at a temperature within the mixing temperature range can be used without addition of inert solvents for mixing with the reactive monomers. Vinyl polymers which are not present in a flowable form in the mixing temperature range can be converted to a flowable form via addition of an inert solvent or of a mixture of inert solvents. When inert solvents are added, it is preferable to use the smallest possible amount of inert solvents; it is particularly preferable to use just sufficient inert solvents to ensure that the vinyl polymers are in a flowable form at the respective temperature within the mixing temperature range. It is preferable that the solids content of the vinyl polymers in the inert solvents is from 30 to 99% by weight, particularly from 50 to 99% by weight, and very particularly from 60 to 99% by weight, and most preferably from 70 to 95% by weight.

The form in which the reactive monomers are used for mixing with the vinyl polymers can be that of solution in one or more inert solvents, or undiluted. It is preferable that the reactive monomers are used undiluted.

If the vinyl polymers are produced by a bulk-polymerization process and are present in a flowable form at the desired temperature within the mixing temperature range (variant α)), the vinyl polymers are then preferably used for mixing with the reactive monomers without addition of inert solvents. However, the vinyl polymers obtained by the bulk-polymerization process can also be converted (variant β)) to the desired flowable form via addition of an inert solvent or of a mixture of inert solvents, at any desired temperature within the mixing temperature range, before they are mixed with the reactive monomers.

If the polymerization to produce the vinyl polymers uses a solution- or suspension-polymerization process in a solvent or in a mixture of solvents, where these are exclusively inert solvents, and if the vinyl polymers therein are present in a flowable form (variant γ)) at a temperature within the mixing temperature range, the mixing with the reactive monomers can take place directly after polymerization. However, in variant γ), it is preferable that all of, or a portion of, the solvent present after polymerization is removed by means of distillation at atmospheric pressure or at reduced pressure, preferably at pressures $\leqq 100$ mbar, but care has to be taken here that the amount of inert solvent remaining is sufficient to ensure that the vinyl polymers are present in a flowable form at the desired temperature within the mixing temperature range.

If polymerization is carried out in a solvent or in a mixture of solvents, where these are not exclusively inert solvents, the solvents are at least substantially or preferably completely removed by means of distillation at atmospheric pressure or at reduced pressure, preferably at pressures $\leqq 100$ mbar, and the mixing of the vinyl polymers with the reactive monomers is carried out by analogy with one of the variants α) or β).

The familiar apparatuses known to the person skilled in the art can be used for mixing the vinyl polymers with the reactive monomers, examples being reactors, stir tanks, or mixers, and examples of stirrers being blade stirrers, anchor stirrers, or paddle stirrers. Mixing is preferably carried out directly in the polymerization reactor.

A semibatch process can be used for mixing the vinyl polymers with the reactive monomers, where either the vinyl polymers or the reactive monomers, if appropriate in inert solvents and, if appropriate, after heating within the mixing temperature range, are used as initial charge in the mixing apparatus, and the other component, if appropriate in inert solvents and, if appropriate, after heating within the mixing temperature range, is added; or preferably a semibatch process can be used, where vinyl polymers are used as initial charge and the reactive monomers are added. As an alternative, a continuous process can also be used for mixing the vinyl polymers with the reactive monomers, where the components can be, if appropriate, added separately (spatially and chronologically) during the mixing process.

To the extent that the vinyl polymers and the reactive monomers have been mixed in the presence of inert solvents, the inert solvents are removed by distillation at atmospheric pressure or at reduced pressure, preferably at pressures $\leqq 100$ mbar, thus giving solutions of vinyl polymers in reactive monomers. Conduct of the distillation at reduced pressure permits distillation to remove the inert solvents at relatively low temperatures; this is particularly advantageous when using reactive monomers that are thermally unstable, and it inhibits undesired thermally initiated polymerization.

In order to lower the residual content of inert solvents in the solutions thus obtained, it can be advantageous to add further amounts of one or more reactive monomers undiluted and then, via distillation as described above, to remove the added amounts of reactive monomers together with residual amounts of inert solvents. Residual amounts of inert solvents are preferably removed by from 1 to 3 implementations in total of the following procedure, in the following sequence: addition of further amounts of one or more reactive monomers and removal of inert solvents by distillation.

As an alternative, it is also possible to add reactive monomers continuously during the removal of inert solvents by distillation. In the continuous procedure, it is preferable that the amounts added of the reactive monomers correspond to the amounts of inert solvents removed by distillation.

This method can give solutions of vinyl polymers in reactive monomers with any desired, or preferably low, contents of inert solvents. It is preferable that the solutions of vinyl polymers in reactive monomers comprise $\leq 20\%$ by weight, particularly $\leq 10\%$ by weight, very particularly $\leq 1\%$ by weight, and most preferably $\leq 0.5\%$ by weight, of inert solvents, based in each case on the total weight of the solutions of the invention.

The amounts of inert solvents removed by distillation, and any reactive monomers concomitantly removed by this distillation process, can, if appropriate after purification, be reintroduced into the appropriate step of the process of the invention, or can be recycled by any other route.

The content of the vinyl polymers and, respectively, of the reactive monomers in the solutions of the invention can be adjusted via final addition of one or more reactive monomers.

The solutions of the invention preferably comprise from 10 to 90% by weight, particularly from 10 to 80% by weight, very particularly from 20 to 75% by weight, and most preferably from 30 to 70% by weight, of reactive monomers, based in each case on the total mass of the solutions.

Preference is also given to solutions of vinyl polymers in reactive monomers with from 10 to 90% by weight content of vinyl polymers, particularly from 20 to 90% by weight, based in each case on the total weight of the solutions.

The process of the invention can use vinyl polymers with any desired glass transition temperatures Tg. However, advantageously it is also possible to achieve problem-free use of vinyl polymers with low glass transition temperatures, for example vinyl polymers with glass transition temperatures $Tg \leq 35°$ C., preferably $\leq 30°$ C., particularly preferably $\leq 20°$ C., and most preferably $\leq 10°$ C.

The process of the invention also provides easy access to solutions of vinyl polymers in reactive monomers, where these are susceptible to thermally initiated polymerization on heating. When thermally unstable reactive monomers are used, by increasing the amount of inert solvents it is possible to ensure that the vinyl polymers are present in a flowable form at temperatures at which no thermally initiated polymerization takes place. It is possible to add one or more polymerization inhibitors in one or more steps of the process after conclusion of the polymerization process, in order to suppress undesired polymerization processes. Polymerization inhibitors provide partial or complete inhibition of polymerization processes relating to ethylenically unsaturated monomers. Examples of suitable polymerization inhibitors are hydroquinone, hydroquinone monomethyl ether, and 4-tert-butylcatechol. The amount of polymerization inhibitors added can, for example, be from 10 to 500 ppm, based on the total mass of the solution of vinyl polymers in reactive monomers.

The invention further provides solutions of vinyl polymers in reactive monomers obtainable via
a) free-radical-initiated polymerization from one or more ethylenically unsaturated monomers selected from the group consisting of vinyl esters, acrylic esters, and methacrylic esters, and, if appropriate, from one or more other ethylenically unsaturated monomers, and then
b) if appropriate, removing volatile constituents by distillation, and
c) if appropriate, addition of one or more inert solvents,
d) mixing with one or more reactive monomers, and
e) if appropriate, removing the inert solvents by distillation, characterized in that
the vinyl polymers are not present in the form of isolated solid in any of the steps a) to e).

The solutions of the invention are suitable for any of the applications that use solutions of vinyl polymers in reactive monomers. The solutions of the invention can be used, for example, in UV-crosslinking systems, or as additive in producing composite components, for example plastics components.

It is preferable that the solutions of the invention are used as low-profile additives (LPA) for producing plastics parts in the form of sheets based on unsaturated polyester resin compositions (UP resins). A problem in the production of these unsaturated polyester resin compositions is volume shrinkage that occurs during the course of curing of the polyester resin. These materials known as LPA are added in order to inhibit said shrinkage during the hardening of the polyester resin. The low-profile additive reduces shrinkage during hardening, dissipates intrinsic stresses, reduces microcracking, and facilitates compliance with manufacturing tolerances. Preferred hardening temperatures are $\geq 130°$ C.

For the low-profile-additive application, the solutions of vinyl polymers in reactive monomers are applied, generally in styrene, and, if appropriate, together with further additives, such as fillers, thickeners, initiators, and processing aids. The solutions of the invention, comprising vinyl polymers in reactive monomers, can also be used in combination with conventional low-profile additives, for example in combination with polyvinyl acetate, carboxy-functional polyvinyl acetates, and polymethyl methacrylate.

The unsaturated polyester resin compositions used usually comprise reaction products of a dicarboxylic acid or of a dicarboxylic anhydride with a polyol. These polyester resin compositions usually also comprise one or more monomers having ethylenically unsaturated groups, generally styrene. Styrene is added to the polyester resin composition in order to dissolve the polyester and to ensure that the polyester composition is flowable. The polyester resin compositions also comprise fiber materials, such as glass fiber, carbon fiber, or corresponding fiber mats, in order to reinforce the plastics parts obtained using the polyester resin composition (fiber reinforced plastic composites=FRP composites).

The crosslinkable vinyl ester copolymers can be used as low-profile additive for any of the familiar production processes associated with FRP composites, examples being sheet molding compound technology (SMC), bulk molding compound technology (BMC), resin transfer molding (RTM), resin injection molding (RIM). In the BMC process, the constituents of the compounded material, the styrenic polyester resin solution, the low-profile additive, the crosslinking catalyst, filler, mold-release agent, and also, if appropriate, other additives are mixed to give a paste, and glass fiber is then admixed, and pressure and heat are then used to produce the molding. By way of example, said technique is used to produce reflectors for automobile headlamps. The SMC process is analogous to the BMC process in producing a paste from styrenic polyester resin solution, low-profile additive, crosslinking catalyst, filler, mold-release agent, and also, if appropriate, other additives, and this is applied to a polyamide film. Glass fiber is then scattered onto said layer, and finally another layer of the paste is applied. This sandwich sheet is then peeled away from the film, and cut into sections, and is pressed with pressure and heat to give moldings. Examples of moldings produced by means of this technology are tailgates for automobiles.

The formulations for FRP composites for BMC technology (bulk molding compound) and for SMC technology are known to the person skilled in the art. A typical formulation comprises from 60 to 70 parts by weight of unsaturated polyester resin (in the form of solution of strength from 50 to 75% in styrene), from 30 to 40 parts by weight of low-profile additive (in the form of solution of strength from 30 to 50% in styrene), from 0.5 to 2 parts by weight of initiator, such as tert-butyl perbenzoate, from 150 to 200 parts by weight of filler, such as calcium carbonate, from 25 to 30 parts by weight of glass fiber, from 0.5 to 3 parts by weight of mold-release agent, such as zinc stearate, and also, if appropriate, other additives, such as pigments, thickeners, flame-retardant additions.

When the solutions of vinyl polymers in reactive monomers are used in the invention, the amount used of the vinyl polymers is from 10 to 100% by weight, preferably from 50 to 100% by weight, based in each case on the amount by weight of low-profile additive in the formulation.

The examples below serve for further explanation of the invention, without in any way restricting the same.
Production of the Solutions of a Vinyl Polymer in Reactive Monomers:

INVENTIVE EXAMPLE 1

207.0 g of methanol, 15.0 g of acetaldehyde, 60.0 g of vinyl acetate, 40.0 g of vinyl laurate, and 0.5 g of PPV (tert-butyl perpivalate, 75% strength solution in aliphatics) were used as initial charge in a stirred 3 l glass pot with anchor stirrer, reflux condenser, and feed equipment. The receiver was then heated to 70° C. at a stirrer speed of 200 rpm with nitrogen. Once the internal temperature of 70° C. had been reached, the monomer feed was begun, and 540.0 g of vinyl acetate and 360.0 g of vinyl laurate were added within a period of 240 minutes. The initiator solution (1.5 g of PPV) was added in parallel, but within a period of 300 minutes. Once the initiator additions had ended, polymerization was continued at 80° C. for a further two hours. This gave a clear solution of the vinyl polymer with solids content of 82% by weight.

300.0 g of styrene were then added at 50° C., and 250.0 g of distillate were removed by distillation at a pressure of 10 mbar. A second batch of styrene was then added (500.0 g, stabilized with 75 ppm of TBC (4-tert-butylcatechol), based on total weight of the 40% strength styrenic solution). A distillate comprising methanol and styrene was then removed by distillation at a pressure of 10 mbar. In all of the steps of the process, the vinyl polymers were present exclusively in solutions with viscosities $\leq$1 000 000 Pa·s (determined using the Bohlin CVO 120 HR rheometer at the respective temperature in the respective step of the process). Addition of a further 700.0 g of styrene gave a styrenic solution with solids content of 40% by weight of vinyl polymers and viscosity of 3400 mPa·s (determined by the Brookfield method at 20 rpm and 23° C.). The residual methanol content in the solution was 4290 ppm. The Tg of the vinyl polymer was 0° C. (determined by means of DSC (differential scanning calorimetry); Mettler DSC 821 E; heating rate 20° C./min).

INVENTIVE EXAMPLE 2

By analogy with the procedure of inventive example 1, a vinyl polymer was produced, composed of 60% by weight of vinyl acetate and 40% by weight of vinyl laurate. Unlike in inventive example 1, however, 220.0 g of isopropanol replaced the methanol and the acetaldehyde. In all of the steps of the process, the vinyl polymers were present exclusively in flowable forms with viscosities $\leq$1 000 000 Pa·s (determined using the Bohlin CVO 120 HR rheometer at the respective temperature in the respective step of the process). A styrenic solution was obtained with solids content of 40% by weight of vinyl polymer and viscosity of 2900 mPa·s (determined by the Brookfield method at 20 rpm and 23° C.). The residual content of isopropanol in the solution was 6800 ppm, and the Tg of the vinyl polymer was −1° C.

INVENTIVE EXAMPLE 3

By analogy with the procedure of inventive example 1, a vinyl polymer was produced, composed of 60% by weight of vinyl acetate and 40% by weight of butyl acrylate. After the continued polymerization (for two hours at 80° C.), the mixture was heated to 130° C., and the volatile constituents were removed by distillation under a vacuum of 10 mbar within a further period of 2 h. The polymer melt was then dissolved stepwise by adding a total of 200 g of methanol in portion, the internal temperature being lowered here to 50° C. In all of the steps of the process, the vinyl polymers were present exclusively in flowable forms with viscosities $\leq$1 000 000 Pa·s (determined using the Bohlin CVO 120 HR rheometer at the respective temperature in the respective step of the process). Again, by analogy with inventive example 1, a styrenic solution was produced with solids content of 40% by weight of vinyl polymer. Its viscosity was 5200 mPa·s (determined by the Brookfield method at 20 rpm and 23° C.) and its residual methanol content was 3420 ppm. The Tg of the vinyl polymer was −9° C.

INVENTIVE EXAMPLE 4

By analogy with the procedure of inventive example 3, a vinyl polymer was produced, composed of 59% by weight of vinyl acetate, 40% by weight of butyl acrylate, and 1% by weight of crotonic acid. In all of the steps of the process, the vinyl polymers were present exclusively in flowable forms with viscosities $\leq$1 000 000 Pa·s (determined using the Bohlin CVO 120 HR rheometer at the respective temperature in the respective step of the process). The viscosity of the resultant styrenic solution with solids content of 40% by weight of vinyl polymer was 4700 mPa·s (determined by the Brookfield method at 20 rpm and 23° C.) and its residual methanol content was 3420 ppm. The Tg of the vinyl polymer was −8° C.

INVENTIVE EXAMPLE 5

By analogy with the procedure of inventive example 3, a vinyl polymer was produced, composed of 59% by weight of vinyl acetate, 40% by weight of vinyl laurate, and 1% by weight of crotonic acid. In all of the steps of the process, the vinyl polymers were present exclusively in flowable forms with viscosities $\leq$1 000 000 Pa·s (determined using the Bohlin CVO 120 HR rheometer at the respective temperature in the respective step of the process). The viscosity of the styrenic solution with solids content of 40% by weight of vinyl polymer was 4900 mPa·s (determined by the Brookfield method at 20 rpm and 23° C.) and its residual methanol content was 3840 ppm. The Tg of the polymer was +1° C.

INVENTIVE EXAMPLE 6

By analogy with the procedure of inventive example 3, a vinyl polymer was produced, composed of 80% by weight of vinyl acetate and 20% by weight of vinyl laurate. In all of the steps of the process, the vinyl polymers were present exclusively in flowable forms with viscosities ≦1 000 000 Pa·s (determined using the Bohlin CVO 120 HR rheometer at the respective temperature in the respective step of the process). The viscosity of the styrenic solution with solids content of 40% by weight of vinyl polymer was 7300 mPa·s (determined by the Brookfield method at 20 rpm and 23° C.) and its residual methanol content was 5320 ppm. The Tg of the vinyl polymer was +20° C.

INVENTIVE EXAMPLE 7

By analogy with the procedure of inventive example 3, a vinyl polymer was produced, composed of 40% by weight of vinyl acetate and 60% by weight of vinyl laurate. In all of the steps of the process, the vinyl polymers were present exclusively in flowable forms with viscosities ≦1 000 000 Pa·s (determined using the Bohlin CVO 120 HR rheometer at the respective temperature in the respective step of the process). The viscosity of the styrenic solution with solids content of 40% by weight of vinyl polymer was 3280 mPa·s (determined by the Brookfield method at 20 rpm and 23° C.) and its residual methanol content was 2430 ppm. The Tg of the vinyl polymer was −21° C.

Use of the Solutions of Vinyl Polymers in Reactive Monomers as LPA:

The SMC formulations from Table 1 were processed as follows to give an SMC molding:

The constituents of the respective SMC formulation, except for the magnesium oxide, were mixed in a dissolver, to give a paste. After 5 minutes, the magnesium oxide was incorporated by stirring at reduced rotation rate. The paste was applied to a polyamide film, using a 1.5 mm doctor. The glass fiber was scattered onto the layer of paste. The same method was used to coat a second polyamide film with paste, and this was then placed over the glass fiber layer. A rolling pin was used to compact the resultant sandwich. The product was stored for 3 days at 20° C. and 50% humidity. The polyamide films were then removed, and the leathery mass was pressed in a familiar SMC press at 160° C. to give a component.

TABLE 1

| SMC formulations: | | |
|---|---|---|
| Constituents | Inv. ex. 8 (ps. by wt.) | Comp. ex. 9 (ps. by wt.) |
| o-Phthalic UP resin (65% by wt. in styrene) | 65.5 | 65.5 |
| Carboxy-functional polyvinyl acetate[a] (40% by wt. in styrene) | 0.0 | 30.0 |
| Vinyl polymer from inventive example 5 (40% by wt. in styrene) | 30.0 | 0.0 |
| Styrene | 4.5 | 4.5 |
| Tert-butyl peroxybenzoate | 1.5 | 1.5 |
| Zinc stearate | 4.0 | 4.0 |
| Carbon black pigment | 10.0 | 10.0 |
| Calcium carbonate | 200.0 | 200.0 |
| Benzoquinon | 0.3 | 0.3 |
| Process additive (wetting agent, degassing) | 7.9 | 7.9 |
| Magnesium oxide | 2.5 | 2.5 |
| Glass fiber | 90.0 | 90.0 |

[a]Vinyl acetate-crotonic acid copolymer having 1% by weight of crotonic acid; the styrenic solution was produced via dissolution of granular copolymer in styrene.

Shrinkage was determined after cooling of the press, and volume change was determined in percent. Minus values indicate that the component had expanded.

TABLE 2

| | X | | | Y | | |
|---|---|---|---|---|---|---|
| | Dimension [mm] | Length [mm] | Shrinkage [%] | Dimension [mm] | Length [mm] | Shrinkage [%] |
| Inv. ex. 8 | 0.386 | 457.381 | −0.40 | 0.448 | 457.443 | −0.53 |
| Comp. ex. 9 | 0.361 | 457.356 | −0.34 | 0.412 | 457.407 | −0.45 |

As can be seen from Table 2, the solutions of the invention comprising vinyl polymers are comparable to conventional, carboxy-functional polyvinyl acetate solutions in inhibiting volume shrinkage when used as LPA. The effect of both in the formulation is that the component expands during its production.

However, an advantage of use of the solutions of the invention is that the user does not first have to devote resources to dissolution of the vinyl polymers, but instead can use these immediately after purchasing them in ready-to-use form. Use of the solutions of the invention is particularly advantageous when using, as LPA, vinyl polymers with low glass transition temperature, e.g. the vinyl polymer used in inventive example 8 (Tg=1° C.), because it is precisely these types of vinyl polymers that are very difficult to convert to solutions in reactive monomers by the conventional processes described in the introduction. Those problems do not occur with use of the solutions of the invention, comprising vinyl polymers in reactive monomers.

What is claimed is:

1. A process for producing solutions of vinyl polymers in reactive monomers, comprising
   a) free-radical-initiated polymerization by bulk-, suspension- or solution-polymerization processes of one or more ethylenically unsaturated monomers selected from the group consisting of vinyl esters, acrylic esters, and methacrylic esters, and optionally also one or more other ethylenically unsaturated monomers, provided that one or more inert solvents are present if the free-radical-initiated polymerization is suspension- or solution-polymerization, and then
   b) optionally removing volatile constituents by distillation,
   c) optionally adding one or more inert solvents, provided that if the free-radical-initiated polymerization is bulk polymerization, the one or more inert solvents are added, d) mixing with one or more reactive monomers, and e) removing the inert solvents of steps a) and/or c) by distillation, wherein in all of the steps of the process prior to and during the mixing with the reactive monomers, the vinyl polymers are present in a flowable form.

2. The process as claimed in claim 1, wherein the vinyl polymers are present in steps a) to e) in flowable forms with viscosities of ≦10,000,000 Pa·s as determined by a Bohlin CVO 120 HR rheometer at the respective temperature in the respective step of the process.

3. The process as claimed in claim 1, wherein the one or more reactive monomers is/are selected from the group consisting of vinyl esters, acrylic esters, and methacrylic esters, vinyl aromatics, olefins, dienes, and vinyl halides.

4. The process as claimed in claim 1, wherein the reactive monomers used comprise one or more ethylenically unsaturated monomers having functional groups selected from the group consisting of epoxy groups, carboxylic acid groups, sulfonic acid groups, and phosphonic acid groups.

5. The process as claimed in claim 1, wherein the glass transition temperatures Tg of the vinyl polymers are ≦35° C.

6. The process as claimed in claim 1, wherein the vinyl polymers are converted to a flowable form via heating and/or via addition of an inert solvent or of a mixture of inert solvents.

7. The process as claimed in claim 1, wherein inert solvents or components for mixtures of inert solvents are selected from the group consisting of alcohols, ketones, esters, ethers, and aliphatic or aromatic hydrocarbons.

8. The process as claimed in claim 1, wherein the mixing of the vinyl polymers with the reactive monomers is carried out at a temperature in a range from 20 to 140° C.

9. The process as claimed in claim 1, wherein the solutions of vinyl polymers in reactive monomers comprise ≦20% by weight of inert solvents, based on the total weight of the respective solution.

10. The process as claimed in claim 1, wherein the solutions of vinyl polymers in reactive monomers comprise from 10 to 90% by weight of vinyl polymers, based on the total weight of the respective solution.

11. The process as claimed in claim 1, wherein in one or more steps of the process after conclusion of the polymerization a) one or more polymerization inhibitors is/are added.

* * * * *